(12) United States Patent
Richter et al.

(10) Patent No.: US 12,063,391 B2
(45) Date of Patent: Aug. 13, 2024

(54) DECORRELATION TRANSFORM FOR A COLOR FILTER ARRAY PATTERN IMAGE

(71) Applicant: Fraunhofer-Gesellschaft zur Förderung der angewandten Forschung e.V., Munich (DE)

(72) Inventors: Thomas Richter, Erlangen (DE); Christian Minuth, Erlangen (DE); Micha Nietsch, Erlangen (DE); Christian Scherl, Erlangen (DE); Wolfgang Heppner, Erlangen (DE); Tobias Jaschke, Erlangen (DE); Marcus Freisleben, Erlangen (DE); Bilal Ahmed, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 39 days.

(21) Appl. No.: 18/045,859

(22) Filed: Oct. 12, 2022

(65) Prior Publication Data
US 2023/0055561 A1 Feb. 23, 2023

Related U.S. Application Data

(63) Continuation of application No. PCT/EP2020/060790, filed on Apr. 16, 2020.

(51) Int. Cl.
H04N 19/60 (2014.01)
H04N 19/593 (2014.01)

(52) U.S. Cl.
CPC .......... *H04N 19/60* (2014.11); *H04N 19/593* (2014.11)

(58) Field of Classification Search
CPC ............................ H04N 19/60; H04N 19/593
USPC ...................................................... 375/240.12
See application file for complete search history.

(56) References Cited

PUBLICATIONS

International Search Report and Written Opinion dated Oct. 13, issued in application No. PCT/EP2020/060790.
ISO/IEC 15444-1, Fourth edition 2019.10, "Information technology—JPEG 2000 image coding system", Part 1: Core coding system; pp. 1-234.
ISO/IEC 21122-1, First edition 2019.05, "Information technology—JPEG XS low-latency lightweight image coding system", Part 1: Core coding system; pp. 1-78.
International Search Report and Written Opinion dated Oct. 13, 2020 issued in application No. PCT/EP2020/060790.
Lee, S.Y., et al.; "A Novel Approach for Compression of Images Captured using Bayer Color Filter Arrays;" Cornell University; Mar. 2009; pp. 1-34.
Richter, T., et al.; "Bayer Pattern Compression with JPEG XS;" 2019 IEEE International Conference on Image Processing (ICIP); IEEE; 2019; pp. 3177-3181.
Malvar, H.S., et al.; "Progressive-to-Lossless Compression of Color-Filter-Array Images Using Macropixel Spectral-Spatial Transformation;" Data Compression Conference; IEEE; 2012; pp. 3-12.

(Continued)

*Primary Examiner* — Nguyen T Truong
(74) *Attorney, Agent, or Firm* — McClure, Qualey & Rodack, LLP

(57) ABSTRACT

A concept for coding a CFA pattern image is provided, wherein, for each of the sample clusters of the CFA pattern image, having first to fourth sample positions, first to fourth color coordinates are computed, so as to provide an image representation of the CFA pattern image.

24 Claims, 7 Drawing Sheets

(56) References Cited

PUBLICATIONS

Taizo, S.; "Lossless Compression of CFA-Sampled Images Using YDGCOCG Transforms with CDF Wavelets;" 2018 25TH IEEE International Conference on Image Processing (ICIP); IEEE; 2018; pp. 1143-1147.

Malvar, H., et al.; "YCoCg-R: A Color Space with RGB Reversibility and Low Dynamic Range;" Joint Video Team (JVT) of ISO/IEC MPEG & ITU-T VCEG(ISO/IEC JTC1/SC29/WG11 and ITU-T SG16 Q6); Jul. 2003; pp. 1-8.

DECORRELATION TRANSFORM FOR A COLOR FILTER ARRAY PATTERN IMAGE

CROSS-REFERENCE TO RELATED APPLICATION

This application is a continuation of copending International Application No. PCT/EP2020/060790, filed Apr. 15, 2020, which is incorporated herein by reference in its entirety.

TECHNICAL FIELD

Embodiments of the present disclosure relate to an apparatus for coding a CFA pattern image into an image representation and to an apparatus for decoding an image representation into a CFA pattern image. Embodiments of the present disclosure also relate to a transformation for CFA pattern images, and in particular to a color decorrelation or a combined color and spatial decorrelation for CFA pattern images.

BACKGROUND OF THE INVENTION

Typical digital cameras are equipped with so-called CFA pattern sensors (for example Bayer sensors) that consist of a regular grid of sensor elements, overlaid with a regular pattern (or array) of color filters to generate three color channels (see FIG. 1). Typically, filters correspond to red, green and blue light, but other filter arrangements are also possible, e.g. red, clear (no filter), blue. This way, three independent color channels can be captured, though they are not aligned to each other and additional post-processing is performed to generate a full color image from the captured image.

In order to save bandwidth and processing power near the sensor, it is the intent to compress the CFA sensor data as-is, i.e. without reconstruction (or post-processing) to a full-resolution RGB (true-color) image, transmit the compressed CFA image signal, and reconstruct it at the receiver side. The generation of a full-resolution true-color image, i.e. the postprocessing step, is then performed at the decoder side on the reconstructed CFA image data. As this entails the transmission of only 1 component per sensor instead of 3, bandwidth is already reduced.

Effective transmission and bandwidth reduction usually further includes lossy compression of the CFA data, which consists of multiple steps; First, a decorrelation across components, denoted the "color decorrelation", a spatial signal decorrelation—e.g. by a wavelet or DCT (discrete cosine transformation)—followed by quantization (irreversible reduction of precision), followed by entropy coding of the data.

Both the color and spatial decorrelation processes aim for facilitating and efficient encoding process and a high compression rate combined with a high quality of the decoded image.

SUMMARY

An embodiment may have an apparatus for decoding an image representation into a color filter array (CFA) pattern image, wherein the CFA pattern image has first samples of a first channel, second samples of a second channel, and third samples of a third channel, wherein the CFA pattern image is partitioned into sample clusters, each of which has first to fourth sample positions with one of the first samples located at the first sample position, one of the second samples located at the second sample position, and two third samples located at the third and fourth sample positions, respectively, wherein the apparatus is configured to derive, for each sample cluster, a first color coordinate for the first sample position of the respective sample cluster, a second color coordinate for the second sample position of the respective sample cluster, a third color coordinate for the third sample position of the respective sample cluster and a fourth color coordinate for the fourth sample position of the respective sample cluster, wherein the apparatus is configured to decode the image representation into the CFA pattern image by computing for the third sample position of each sample cluster, the third sample at the respective third sample position by forming a difference of the third color coordinate at the third sample position and a first filtered color coordinate which is derived by forming a third weighted sum of first and second color coordinates located at first and second sample positions neighboring the third sample position in a manner so that a sum of weights of the third weighted sum is larger than one half, for the fourth sample position of each sample cluster, the third sample at the respective fourth sample position by forming a difference of the fourth color coordinate at the fourth sample position and a second filtered color coordinate which is derived by forming a fourth weighted sum of first and second color coordinates located at first and second sample positions neighboring the fourth sample position in a manner so that a sum of weights of the fourth weighted sum is larger than one half, for the first sample position of each sample cluster, the first sample at the respective first sample position by forming a summation of the first color coordinate at the first sample position and a first filtered third sample value derived by forming a first weighted sum of third samples computed for third and fourth sample positions neighboring the first sample position, for the second sample position of each sample cluster, a second sample at the respective second sample position by forming a summation of the second color coordinate at the second sample position and a second filtered third sample value derived by forming a second weighted sum of third samples computed for third and fourth sample positions neighboring the second sample position.

Another embodiment may have an apparatus for coding a color filter array (CFA) pattern image into an image representation, wherein the CFA pattern image has first samples of a first channel, second samples of a second channel, and third samples of a third channel, wherein the CFA pattern image is partitioned into sample clusters, each of which has first to fourth sample positions with one of the first samples located at the first sample position, one of the second samples located at the second sample position, and two third samples located at the third and fourth sample positions, respectively, wherein the apparatus is configured to code the CFA pattern image into the image representation by computing for the first sample position of each sample cluster, a first color coordinate so that the first color coordinate is representative of a difference of the first sample at the first sample position and a first filtered third sample value derived by forming a first weighted sum of third samples neighboring the first sample position, for the second sample position of each sample cluster, a second color coordinate so that the second color coordinate is representative of a difference of the second sample at the second sample position and a second filtered third sample value derived by forming a second weighted sum of third samples neighboring the second sample position, for the third sample position of each sample cluster, a third color coordinate by forming a summation of the third sample at the third sample position and a first filtered color coordinate which is derived by forming a third weighted sum of first and second color coordinates computed for first and second sample positions neighboring the third sample position in a manner so that a sum of weights of the third weighted sum is larger than one half, for the fourth sample position of each sample cluster, a fourth color coordinate by forming a summation of the third sample at the fourth sample position and a second filtered color coordinate which is derived by a fourth weighted sum of first and second color coordinates computed for first and second sample positions neighboring the fourth sample position in a manner so that a sum of weights of the fourth weighted sum is larger than one half.

Another embodiment may have a method for decoding an image representation into a CFA pattern image, wherein the CFA pattern image has first samples of a first channel, second samples of a second channel, and third samples of a third channel, wherein the CFA pattern image is partitioned into sample clusters, each of which has first to fourth sample positions with one of the first samples located at the first sample position, one of the second samples located at the second sample position, and two third samples located at the third and fourth sample positions, respectively, wherein the method has deriving, for each sample cluster, a first color coordinate for the first sample position of the respective sample cluster, a second color coordinate for the second sample position of the respective sample cluster, a third color coordinate for the third sample position of the respective sample cluster and a fourth color coordinate for the fourth sample position of the respective sample cluster, wherein the method has decoding the image representation into the CFA pattern image by computing for the third sample position of each sample cluster, the third sample at the respective third sample position by forming a difference of the third color coordinate at the third sample position and a first filtered color coordinate which is derived by forming a third weighted sum of first and second color coordinates located at first and second sample positions neighboring the third sample position in a manner so that a sum of weights of the third weighted sum is larger than one half, for the fourth sample position of each sample cluster, the third sample at the respective fourth sample position by forming a difference of the fourth color coordinate at the fourth sample position and a second filtered color coordinate which is derived by forming a fourth weighted sum of first and second color coordinates located at first and second sample positions neighboring the fourth sample position in a manner so that a sum of weights of the fourth weighted sum is larger than one half, for the first sample position of each sample cluster, the first sample at the respective first sample position by forming a summation of the first color coordinate at the first sample position and a first filtered third sample value derived by forming a first weighted sum of third samples computed for third and fourth sample positions neighboring the first sample position, for the second sample position of each sample cluster, a second sample at the respective second sample position by forming a summation of the second color coordinate at the second sample position and a second filtered third sample value derived by forming a second weighted sum of third samples computed for third and fourth sample positions neighboring the second sample position.

Still another embodiment may have a method for coding a color filter array (CFA) pattern image into an image representation, wherein the CFA pattern image has first samples of a first channel, second samples of a second channel, and third samples of a third channel, wherein the CFA pattern image is partitioned into sample clusters, each of which has first to fourth sample positions with one of the first samples located at the first sample position, one of the second samples located at the second sample position, and two third samples located at the third and fourth sample positions, respectively, wherein the method has coding the CFA pattern image into the image representation by computing for the first sample position of each sample cluster, a first color coordinate so that the first color coordinate is representative of a difference of the first sample at the first sample position and a first filtered third sample value derived by forming a first weighted sum of third samples neighboring the first sample position, for the second sample position of each sample cluster, a second color coordinate so that the second color coordinate is representative of a difference of the second sample at the second sample position and a second filtered third sample value derived by forming a second weighted sum of third samples neighboring the second sample position, for the third sample position of each sample cluster, a third color coordinate by forming a summation of the third sample at the third sample position and a first filtered color coordinate which is derived by forming a third weighted sum of first and second color coordinates computed for first and second sample positions neighboring the third sample position in a manner so that a sum of weights of the third weighted sum is larger than one half, for the fourth sample position of each sample cluster, a fourth color coordinate by forming a summation of the third sample at the fourth sample position and a second filtered color coordinate which is derived by a fourth weighted sum of first and second color coordinates computed for first and second sample positions neighboring the fourth sample position in a manner so that a sum of weights of the fourth weighted sum is larger than one half.

Another embodiment may have a non-transitory digital storage medium having stored thereon a computer program for performing the above inventive methods for decoding and coding, when said computer program is run by a computer.

Another embodiment may have a data stream having the image representation generated with the above inventive apparatus for encoding.

Embodiments of the present disclosure according to a first aspect of the present invention are based on the finding that a CFA pattern image can be more efficiently encoded if the energy of two channels of the CFA pattern image is compacted into, or primarily make up, one output coordinate of the output image representation. In contrast to common transformations, which aim for compacting the energy of three channels of the CFA pattern image into one coordinate, the disclosed concept enables a higher coding efficiency, for example in terms of an improved signal-to-noise ratio of the restored CFA pattern image.

Additionally, embodiments of the present disclosure according to a second aspect of the present invention which may be combined with the first aspect are based on the finding, that the quality of coding a CFA pattern image may be improved by considering, for the coding of a sample cluster such as, for example, a super pixel, such as for sake of spatial decorrelation, samples of the CFA pattern image which are located in a portion of the CFA pattern image crossed by lines and rows of the CFA pattern image including at least one line as well as at least one row offset to the samples of the sample cluster currently to be coded. By considering a larger portion of the CFA pattern image, decorrelation may be improved and, thus, the energy may be compacted more efficiently, allowing for a higher compression rate and are a lower signal-to-noise ratio.

According to the first aspect of the present disclosure, this finding is exploited for coding a CFA pattern image partitioned into sample clusters having each one first sample of a first channel, one second sample of a second channel, and two third samples of a third channel of the CFA pattern image. The coding of the CFA pattern image comprises computing, for the first and second sample positions of each sample cluster, a first and a second color coordinate, respectively, by forming a difference of the first sample or the second sample, respectively, of the respective sample cluster and a first or second filtered third sample value, respectively. A further step of the coding of the CFA pattern image comprises computing, for the third and fourth sample position of each sample cluster, a third and fourth color coordinate, respectively, by forming a summation of the third sample or fourth sample of the respective sample cluster and a first or second filtered color coordinate, respectively. The first and second filtered color coordinates are derived by forming a third and a fourth weighted sum of first and second color coordinates neighboring the respective third and fourth sample positions, wherein a sum of weights of each of the third and fourth weighted sums is larger than one half. It may be equal to, or larger than, one. In an example, the sum is larger than one quarter for weights relating to the first color coordinates and larger than one quarter for weights relating to the second color coordinates. It may be equal to, or larger than, 0.5. Due to this choice of the weights of the third and fourth weighted sums for the calculation of the third and fourth color coordinates, the first and second channels, in particular low frequency components, are overweight in the third and fourth color coordinate with respect to the first channel or, alternatively speaking, the energy of the third and fourth color coordinates is primarily determined by the energy of the first and second channels of the CFA pattern image, what turns out to end-up into a better decorrelation and, thereby, leads to a higher compression rate or a lower quantization loss in a following quantization and entropy coding process. In case of an RGB pattern with third channel being green and equal weights for the first and second samples, the third and fourth color coordinates primarily corresponds to a magenta color of the low pass filtered version of the CFA image, or a mixture of blue and red, with no or only a fraction of green at smaller energy.

According to embodiments, the weights of the third and fourth weighted sums consist of individual weights for weighting first color coordinates and second color coordinates, so that the weights may be separately adapted to a sensitivity of the respective channel. By choosing the weights for the first and second color coordinates so that the first and the second channel are equally weighted in the third and fourth color coordinate, the coding efficiency is increased.

According to embodiments, the weights for weighting first and second color coordinates in the third and fourth weighted sums are each implemented as a power of two, wherein the exponent of each of the powers of two is an integer number. Thus, a multiplication of first and second color coordinates with their respective weight may be performed as a bit shift operation which is computationally efficient.

According to embodiments, a set of operation modes is available for the coding of the CFA pattern image, the first to third samples of which being arranged in rows and columns. In the context of rows and columns, horizontal directions refer to direction with in a row of the CFA pattern image, and a vertical directions refer to directions along columns of the CFA pattern image. Further, the definition of the rows and columns is interchangeable by rotating the CFA pattern image by 90°, so that the attribution of rows and columns is to be understood not limiting. For some examples, the coding of the CFA pattern image may be performed row by row, and a first row which is referred to as being located above a second row is to be understood as to be coded before the second row. Accordingly, the second row is located below the first row. The set of operation modes includes one or more of an isotropic operation mode, a vertical causal operation mode and a stripe operation mode, which differ in a portion of the CFA pattern image which is considered for calculating a color coordinate for a selected sample position of a selected sample cluster. In all of the named operation modes, several samples located in the rows, within which the selected sample cluster is located, are included in the computation of the color coordinate. In the isotropic operation mode, samples located in rows above and below the row, within which the selected sample cluster is located (named the current row), are included in the computation of the color coordinate of the respective type of the selected sample position. By including additional rows to the current rows of the CFA pattern image in the calculation, low-frequency components and high-frequency components of the CFA pattern image in a vertical direction may be separated, enabling a better compacting of the energy of the CFA pattern image into one or more color coordinates. In contrast, using only samples within the current rows, may perform the compaction of energy primarily in a horizontal direction. Thus including additional rows above and/or below the current rows, may provide for a more efficient data compression and a lower signal-to-noise ratio. In the vertical causal operation mode, samples located in rows above but not below the current row are included in the computation of the color coordinate of the respective type of the selected sample position. As no samples located in rows below the current row are considered, the coding may be performed close after receiving data signaling the samples of the current row, without waiting for data signaling the samples of subsequent rows. Still, by considering samples located in rows above the current row, a large portion of the CFA pattern image is considered in calculating the color coordinate, such increasing the quality. Thus, this operation mode may provide for a combination of a high coding quantity and a fast coding. In the stripe operation mode, exclusively samples located within the current row are included in the computation of the color coordinate. Thus, a sample of a specific sample position may be overwritten or dropped at the moment of calculating a color coordinate for the specific sample position and less data referring to rows above the current row needs to be stored, compared to the vertical causal and the isotropic operation mode. Thus, the stripe operation mode combines the advantage of being fast of the vertical causal operation mode with low requirements for memory.

According to an embodiment, the coding of the CFA pattern image includes further steps of computing a differential color coordinate third and fourth color coordinates and of computing a combinational color coordinate based on fourth and differential color coordinates. These steps provided for a particularly high compaction of energy of the CFA pattern image into one color coordinate, namely the combinational color coordinate, thus allowing for a high compression of the image representation by an entropy encoding process.

According to a second aspect of the present disclosure, the above introduced concepts are exploited for coding a CFA pattern image having first samples of a first channel, second samples of a second channel, and third samples of a third channel of the CFA pattern image, the first to third samples being arranged in an array with rows and columns. Coding the CFA pattern image comprises computing, for each of the first sample positions at which the first samples are located, a first color coordinate by forming a difference of the first sample at the respective first sample position and a first filtered third sample value which is derived by forming a first weighted sum of third samples neighboring the first sample position. The third samples for the third weighted sum comprise a third sample located in a row neighboring the one or more rows within which the sample cluster of the respective first sample position is located, named current rows in the following. For example, the neighboring row may be a row above the current rows, and may have been previously coded, so that the row is already available to the coding process. By including third samples of a row neighboring the current rows in the computation of the third weighted sum one additional row is used, but the quality of the coding is enhanced as explained above with respect to the vertical causal and the isotropic operation mode.

According to an embodiment, a set of operation modes is available for the coding a CFA pattern image, the third of operation modes comprising a first operation mode, for example one of the above introduced vertical causal and isotropic operation modes, and a stripe operation mode. In the stripe operation mode, the third samples of the first weighted sum consist of samples located within the current rows. Thus, a selection between operation modes is possible, the stripe operation mode providing for a fast coding and below memory requirements, and the first operation mode providing for a higher quality for higher efficiency of the coding.

Embodiments of the present disclosure according to the first and the second aspect as described above, may be used for coding a CFA pattern image into an image representation, which may be provided as such or may be provided in an encoded representation of the image representation, and for obtaining the CFA pattern image from the image representation or the encoded representation, respectively, by decoding the image representation. Thus, features, functionalities and advantages described with respect to the coding of the CFA pattern image are equally applicable to the coding and the decoding process.

BRIEF DESCRIPTION OF THE DRAWINGS

Advantageous implementations of the present disclosure are the subject of dependent claims and embodiments are described in more detail below with respect to the figures, among which:

DETAILED DESCRIPTION OF THE INVENTION

In the following, embodiments are discussed in detail, however, it should be appreciated that the embodiments provide many applicable concepts that can be embodied in a wide variety of image and video processing and coding. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

Multiple color transformations may be applied for color decorrelation for encoding a CFA pattern image. These transformations may also include spatial decorrelation.

Figure 8:
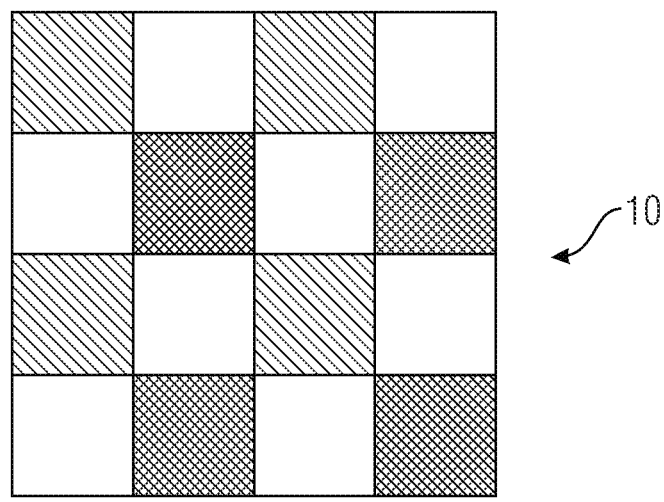
FIG. 8 shows an example of a CFA pattern image.

One example is the RCTD transformation, which is a four-component variant of the ROT transformation applied to true-color images for the purpose of lossy or lossless compression. It separates the CFA pattern as seen in FIG. 8 into 2×2 "super pixels", each of which consists of one red, one blue and two green values, and from them, forms within each super pixel, four components as such:

$$t := \left\lfloor \frac{G_1 + G_2}{2} \right\rfloor$$

$$Y := \left\lfloor \frac{R + 2t + B}{4} \right\rfloor$$

$$C_b := B - t$$

$$C_r := R - t$$

$$\Delta := G_1 - G_2$$

[x] represents a rounding to an integer number, e.g. a floor or round-down operation to the next lower integer number, or a cell or round-up operation to the next higher integer number. This representation is applicable to formulas throughout this application. The quadruple $(Y, C_b, C_r, \Delta)$ is then input to further compression steps. It is easily seen that this transformation is exactly invertible without loss.

Recently, the Belgium company intoPix proposed a variant of the above transformation that includes a spatial decorrelation step along with the color transformation. To this end, it separates the CFA image into horizontal stripes, each of which is two pixels—or one super-pixel—high, and as wide as the entire CFA image. Within each stripe, the color transformation is performed in four lifting steps, each of which invertible by itself.

Figure 9:
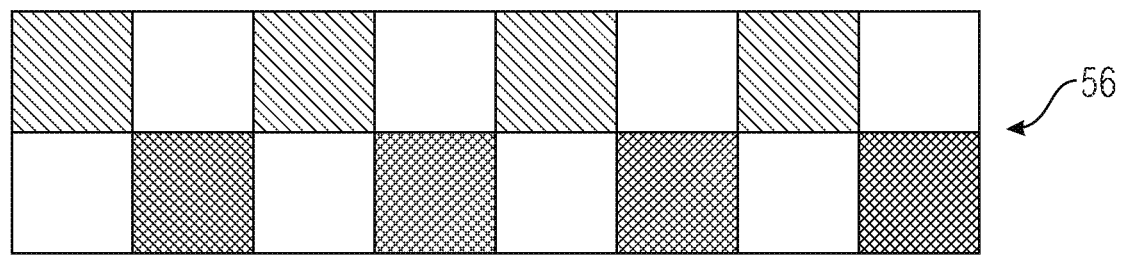
FIG. 9 shows an example of current rows for coding a CFA pattern image in a stripe operation mode.

The first step generates two chroma-coordinates from red and blue, and the neighboring green samples, as shown in FIG. 9.

To define the transformation, indicate the sample value left to the current position by the sub-index l, right to the current position by the sub-index r. Similar, the sub-index t indicates the position to the top, and the sub-index b the sample position below the current sample. Then, the first lifting step subtracts a weighted sum of green sample values from the red and blue values, and thus forms $C_b$ and $C_r$ channels similar to the above, though from a weighted neighborhood of green values:

$$C_b := B - \left\lfloor \frac{G_l + 2G_t + G_r}{4} \right\rfloor$$

$$C_r := R - \left\lfloor \frac{G_l + 2G_b + G_r}{4} \right\rfloor$$

At the left and right edges, the non-existing left green channel is replaced by the right green channel, and at the right image edge, the non-existing right green channel is replaced by the left sample value.

Figure 2:
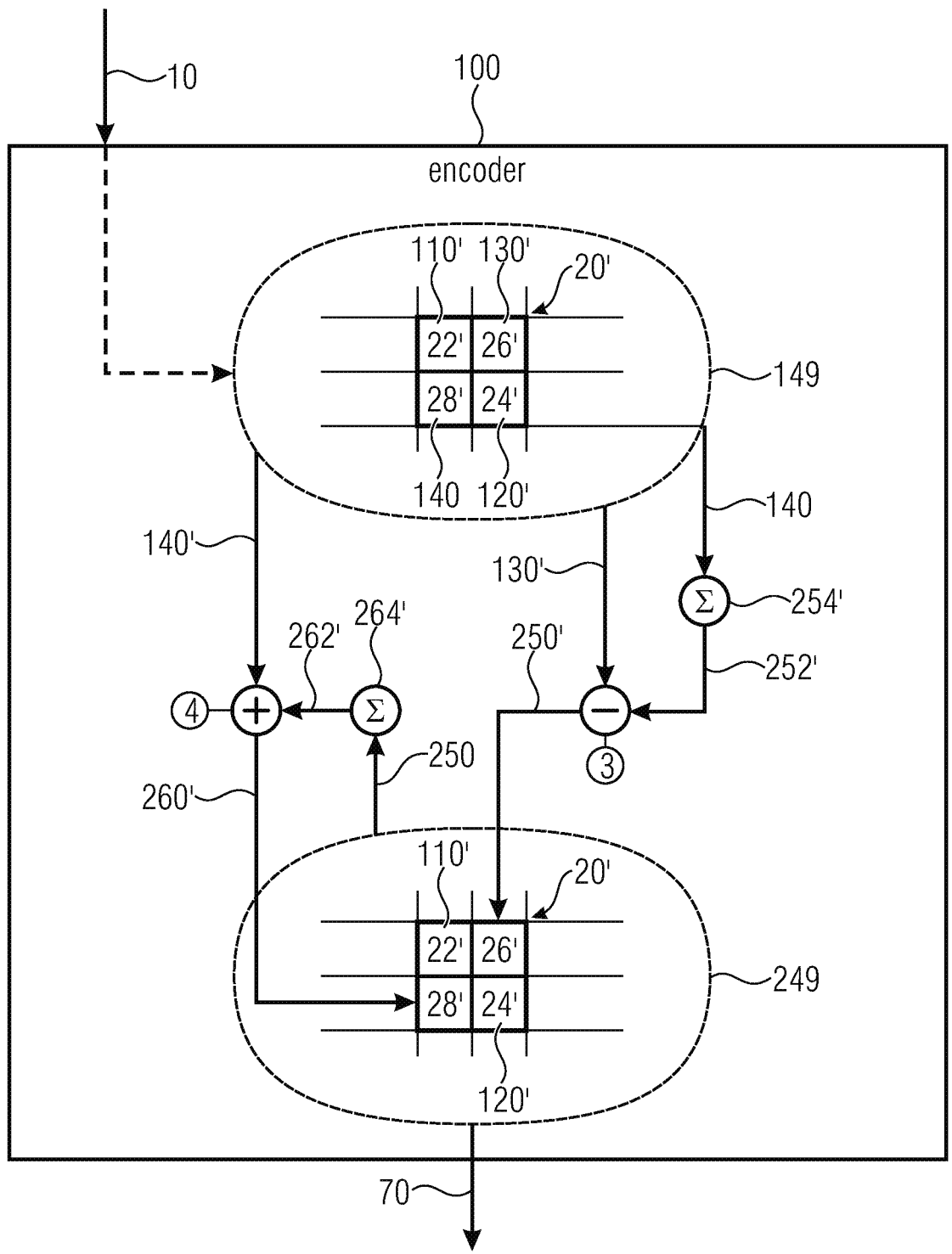
FIG. 2 shows an apparatus for coding a CFA pattern image according to a further embodiment.

In the second lifting step, two luma channels $Y_1$ and $Y_2$ are formed from $C_b$, $C_r$ and the green channels as follows:

$$Y_1 := G + \left\lfloor \frac{C_{r,l} + 2C_{b,b} + C_{r,r}}{8} \right\rfloor$$

$$Y_2 := G + \left\lfloor \frac{C_{b,l} + 2C_{r,t} + C_{b,r}}{8} \right\rfloor$$

Where the $Y_1$ samples are located on the top, and the $Y_2$ samples are located on the bottom row of the two-line pixel arrangement as indicated in FIG. 2.

The third lifting step computes now from $Y_1$ and $Y_2$ a luminance difference channel $\Delta$ on the top row. Similar to the above, the sub-index rt indicates the sample value to the diagonal right-top, lt to the left-top, rb to the right-bottom and lb to the left-bottom. Thus:

$$\Delta := Y_1 - \left\lfloor \frac{Y_{2,lb} + Y_{2,rb}}{2} \right\rfloor$$

The last lifting step, finally, generates the output luminance signal as the average from $Y_1$ and $Y_2$ through the usage of the difference signal $\Delta$:

$$Y := Y_2 + \left\lfloor \frac{\Delta_{lt} + \Delta_{rt}}{4} \right\rfloor$$

The quadruple $(Y,C_b,C_r,\Delta)$ is then input to further compression steps, where $\Delta$ is optionally excluded from any spatial decorrelation as it consists already of a high-pass filtered difference signal.

Similar transforms, i.e. transformations that combine spatial and color decorrelation, have been discussed in the literature before, e.g. by T. Suzuki: "Lossless compression of CFA-sampled images using YDgCoCg transforms with CDF wavelets", in the Proc. of Intl. Conf. on Image Proc. (ICIP), 2018. The transformation discussed there is, however, based on the YCgCo transformation first proposed by H. S. Malvar and G. J. Sullivan in "Progressive-to-lossless compression of color-filter-array images using macropixel spectralspatial transformation," in Proc. of DCC'12, Snowbird, UT, April 2012, pp. 3-12. The Suzuki transform is also based on lifting, similar to the one described by intoPix, though is not confined to two lines.

The above described intoPix transformation aims for compacting the energy of the three channels into one luma channel, namely Y, and is further limited to horizontal stripes. The idea of the first aspect according to the present disclosure is, as introduced before, the compaction of the energy of two of three channels. According to the second aspect of the present disclosure, the transformation includes at least one row of samples exceeding the rows of the currently coded sample cluster.

The first part of the detailed description introduces a general concept which is implemented by embodiments according to both aspects of the present disclosure. Subsequently, different embodiments according to the first and second aspect are specified with reference to the general concept.

Figure 1:
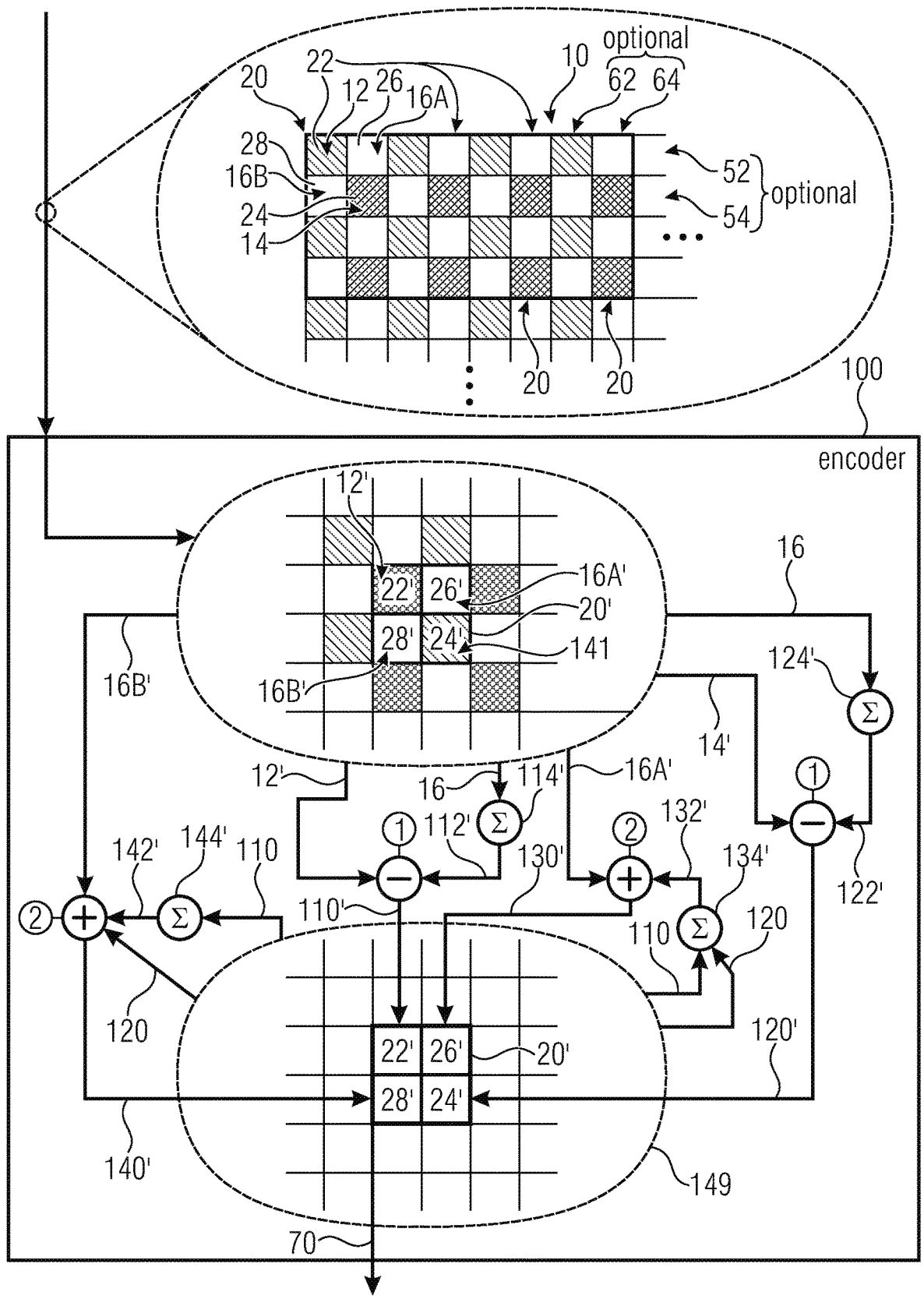
FIG. 1 shows an apparatus for coding a CFA pattern image according to an embodiment.

FIG. 1 shows a schematic representation of an example of an apparatus 100 for coding a CFA pattern image 10 into an image representation 70. The CFA pattern image 10 comprises first samples 12 of a first channel, second samples 14 of a second channel, and third samples 16 of a third channel which include third samples 16A, 16B. For example, the first to third channels consist of a red, a blue and a green channel, or a red, a white and a blue channel.

For example, the CFA image pattern 10 is obtained from a plurality of sensor elements, each of the sensor elements being associated with one of the first channel, the second channel, and the third channel, wherein sensor elements being associated with a common channel are configured to detect light within a common wavelength range, which is specific to the channel. For example, the CFA pattern image may have a Bayer pattern, e.g. as shown in FIG. 8.

The CFA pattern image 10 is partitioned into sample clusters 20, each comprising one of the first samples 12 located at a first sample position 22, one of the second samples 14 located at a second sample position 24, a third sample 16A located at a third sample position 26 and a further third sample 168 located at a fourth sample position 28, respectively.

The apparatus 100 is configured to code the CFA pattern image into the image representation 70 by computing first to fourth color coordinates 110, 120, 130, 140 for the first to fourth sample positions 22, 24, 26, 28 for each of the sample clusters 20. In a step 1, which may be referred to as a first lifting step, the apparatus 100 computes, for each of the sample clusters 20, for the first sample position 22' of a respective sample cluster 20', a first color coordinate 110', for example a first chroma difference channel coordinate, so that the first color coordinate one understood' the present a difference of the first sample) and the first sample position 22' of the respective sample cluster 20' and a first filtered third sample value 112'. The first filtered third sample value 12' is derived by forming a first weighted sum 114' of third samples 16 neighboring the first sample position 22'. It should be noted, that samples neighboring a specific sample position may be part of the same sample cluster is the specific sample position but may also be part of another sample cluster. Further, the apparatus 100 is configured to compute, for the second sample position 24' of the respective sample cluster 20', a second color coordinate 120', for example a second chroma difference channel coordinate, so that the second color coordinate 120' is representative of a difference of the second sample 14' and the second sample position 14' of the respective sample cluster 20' and a second filtered third sample value 122'. The second filtered third sample value 122' is derived by forming a second weighted sum of 124' of third samples 16 neighboring the second sample position 24'.

In a subsequent step 2, which may be referred to as a second lifting step, the apparatus 100 is configured to compute, for each of the sample clusters 20, for the third sample position 26' of the respective sample cluster 20', a third color coordinate 130' by forming a summation, for example an equal weighted summation, of the third sample 16A' at the third sample position 26' of the respective sample cluster 20' and a first filtered color coordinate 132' which is derived by forming a third weighted sum of 134' of first and second color coordinates 110, 120 computed for first and second sample positions 22, 24 neighboring the third sample position 26'. The apparatus 100 is configured to compute, for the fourth sample position 28' of each sample cluster 20', a fourth color coordinate 140' by forming a summation, for example an equal weighted summation, of the third sample 16B' at the fourth sample position 28' of the respective sample cluster 20' and a second filtered color coordinate 142' which is derived by a fourth weighted sum 144' of first and second color coordinates 110, 120 computed for first and second sample positions 22, 24 neighboring the fourth sample position 28'.

For example, the apparatus 100 may provide, for each of the sample clusters 20, the respective first to fourth color coordinates 110, 120, 130, 140 in the image representation 70. A representation of the image representation 70 based on the first to fourth color coordinates 110, 120, 130, 140 may be referred to as transformed representation 149.

Alternatively, the apparatus 100 may be configured to use the third and fourth color coordinates 130, 140, as intermediate values for computing, for each of the sample clusters 20, a differential color coordinate 250 and a combinational color coordinate 260. FIG. 2 shows a schematic representation of another example of the apparatus 100 comprising additionally to the computation of the first to fourth color coordinates 110, 120, 130, 140, two additional steps for computing, based on the third and fourth color coordinates 130, 140, a differential color coordinate 250 and a combinational color coordinate 260. In this case, the apparatus 100 may provide, for each of the sample clusters 20, the respective first, second, differential, and combinational color coordinates 110, 120, 250, 260 in the image representation 70. A representation of the image representation 70 based on the first, second, differential, and combinational color coordinates 110, 120, 250, 260 may be referred to as compacted transformed representation 249.

Accordingly, in a third step 3, which may be referred to as a third lifting step, the apparatus 100 may compute, for each of sample clusters 20, for the third sample position 26' of the respective sample cluster 20', the differential color coordinate 250' by forming a difference of the third color coordinate 130' at the third sample position 26' of the respective sample cluster 20' and a filtered fourth color coordinate 252'. The filtered fourth color coordinate 252' is derived by forming a fifth weighted sum 254', e.g. an equal weighted sum, of fourth color coordinates 140 computed for fourth sample positions 28 neighboring the third sample position 26'.

In a fourth step 4, which may be referred to as a fourth lifting step, the apparatus 100 may compute, for each of the sample clusters 20, for the fourth sample position 28' of the respective sample cluster 20', a combinational color coordinate 260 by forming a summation of the fourth color coordinate 140' at the fourth sample position 28' of the respective sample cluster 20' and a filtered differential color coordinate 262'. The filtered differential color coordinate 262' is derived by forming a sixth weighted sum 264', for example an equal weighted sum, of differential color coordinates 250 computed for third sample positions 26 neighboring the fourth sample position 28'.

According to embodiments, for example as illustrated with respect to the CFA image pattern in FIG. 1, the first to fourth sample positions are arranged in an array with rows of a first type 52 and rows of a second type 54. The rows of the first type 52 comprise alternately arranged first sample positions 22 and third sample positions 26, and the rows of the second type 54 comprise alternately arranged second sample positions 24 and fourth sample positions 28. The rows of the first type 52 and the second type are alternately the arranged along columns of the array. The first sample positions 22 of the first type of rows 52 and the second sample positions 24 of the second type of rows 54 are located in different columns 62, 64 of the array.

Thus, in the described array arrangement, each of the first sample positions 22 is neighbored by four third samples 16, of which two third samples 16A are located at third sample positions 26 neighboring the first sample position 22 in horizontal directions and two third samples 16B are located at fourth sample positions 28 neighboring the first sample position 22 in vertical directions. In this context, horizontal directions refer to top and bottom, and a vertical directions refer to left and right. Equally, each of the second sample positions 24 is neighbored by four third samples 16, of which two third samples 16 are located at third sample positions 26 neighboring the second sample position 24 in vertical direction and two third samples 16 are located at fourth sample positions 28 neighboring the second sample position 24 in horizontal directions. According to the described example of the arrangement of sample positions, each of the sample clusters 20 is located within a pair of two neighboring rows of samples comprising one row of the first type 52 and one row of the second type 54. It is pointed out, the view arrangements of the sample clusters 20 with respect to the first type and rows 52 and the second type of rows 54 as well as with respect to a first type of columns 62 and a second type of columns 64 as shown in FIG. 1 is exemplary, that is upper and lower positions as well as left and right positions of the rows and columns, respectively, may be exchanged, which may result in four different arrangements of the first to fourth sample positions within the sample clusters 20.

For example, the apparatus 100 may perform the calculation of the color coordinates, that is the first to fourth color coordinates 110, 120, 130, 140 and optionally the differential and combinational color coordinates 250, 260, in a row wise manner, that is row by row. Different processing schemes or operation modes may be possible, differing in a size of a portion of the CFA pattern image which serves as source for respective input values for the first to sixth weighted sums 114', 124', 134', 144', 254', 264'.

For example, the apparatus 100 may store the first to fourth color coordinates and/or the differential and combinational color coordinates computed during the respective first to fourth lifting steps in respective data buffers, so that a subsequent lifting step may make use of the stored color coordinates. Buffered color coordinates 110, 120, 130, 140, 250, 260 or samples 12, 14, 16 may be released or overwritten, when not required for the computation of color coordinates of further sample clusters. Thus, the amount of data that is stored in the respective data buffer, hence may depend on a number of neighboring sample positions considered in a lifting step making use of the respective data buffer.

Figure 3:
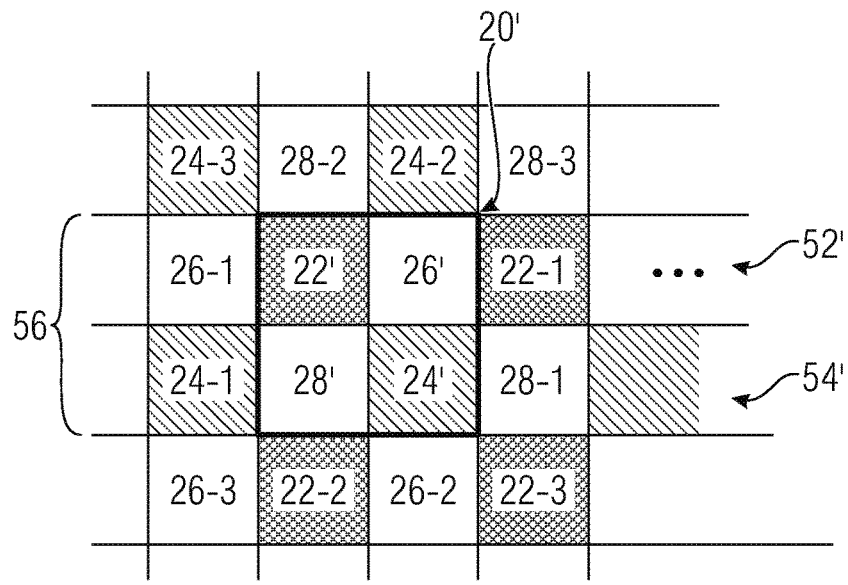
FIG. 3 shows an example of a CFA pattern image.

FIG. 3 illustrates an example of a portion of the CFA pattern image 10 comprising the sample cluster 20', for which to compute color coordinates. The sample cluster 20' is located in the rows of the first and the second type 52', 54', which are referred to as the current rows 56.

For example, the apparatus 100 may operate in a stripe operation mode, or in-line operation mode, in which only samples located at sample positions within the current rows 56 may contribute to the first to sixth weighted sums 114', 124', 134', 144', 254', 264'. Alternatively, the apparatus 100 may operate in a vertical causal operation mode, in which additionally samples located in one or more rows above the current rows 56 may contribute to one or more of the first to sixth weighted sums 114', 124', 134', 144', 254', 264'. In yet another tentative, the apparatus 100 may operate an isotropic operation mode, in which additionally to the vertical causal operation mode samples located in one or more rows below the current rows 56 may contribute to one or more of the first to sixth weighted sums 114', 124', 134', 144', 254', 264'.

It is pointed out, that the detailed description of samples contributing to the first to sixth weighted sums 114', 124', 134', 144', 254', 264' is conducted for sample positions which are not positions at an edge of the CFA pattern image. For edge sample positions, a missing sample position may be replaced by the sample position which is opposite of the missing sample position in view of the sample position for which the respective weighted sum is to be calculated.

In the stripe operation mode, only samples which are located within the current rows 56 are considered as input values for the first to sixth weighted sums 114', 124', 134', 144', 254', 264'. For example, the third samples 16 for the first weighted sum 114' may consist of the third samples 16 located at third sample positions 26-1, 26' neighboring the first sample position 22' of the respective sample cluster 20' in horizontal directions and the third sample 16 located at the fourth sample position 28'. Accordingly, the third samples 16 for the second weighted sum 124' may consist of the third samples 16 located at the fourth sample positions 28-1, 28' neighboring the second sample position 24' of the respective sample cluster 20' in horizontal directions and the third sample 16 located at the third sample position 26'. The first and second color coordinates 110, 120 for computing the fourth weighted sum 144' may consist of the second color coordinates 120 located at the second sample positions 24', 24-1 neighboring the fourth sample position 28' of the respective sample cluster 20' in horizontal directions and the first color coordinate 110 located at the first sample position 22' neighboring the third sample position 26' in a first vertical direction, for example a top direction. Further, the first and second color coordinates 110, 120 for computing the third weighted sum 134' may consist of the first color coordinates 110 located at the first sample positions 22', 22-1 neighboring the third sample position 26' of the respective sample cluster 20' in horizontal directions and the second color coordinate 120 located at the second sample position 24' neighboring the third sample position 26' in a second vertical direction, for example a bottom direction.

The fourth color coordinates 140 and the differential color coordinates 250 for computing the fifth weighted sum 254' and the sixth weighted sum 264', respectively, neighbor the respective third sample position 26' and fourth sample position 28' in diagonal directions of the array. A first and a second diagonal direction refer to diagonal directions which have vertical components pointing towards the first vertical direction or top direction. A third and a fourth diagonal direction refer to diagonal directions which have vertical components pointing towards the second vertical direction or button direction.

In the stripe operation mode, the fourth color coordinates 140 for calculating the fifth weighted sum 254' may consist of the fourth color coordinates 140 computed for the fourth sample positions 28', 28-1 neighboring the third sample position 26' of the respective sample cluster 20 in the third and the fourth diagonal direction of the array, for example the bottom left and button right diagonal directions. Accordingly, the differential color coordinates 250 of the sixth weighted sum 264' may consist of the differential color coordinates 250 computed for the third sample positions 26', 26-1 neighboring the fourth sample position 28' of the respective sample cluster 20' and the first and the second diagonal direction, for example the top left in the top right diagonal directions.

Because in the stripe operation mode samples may be used explicitly only for calculating color coordinates of the current rows 56, a specific sample position may be replaced by the color coordinate calculated for the specific sample position. Thus, this operation mode has particularly low memory requirements. Still, it may improve the performance with respect to state of the art transformation, for example by about 0.3 dB at low bitrates, due to the compaction of the energy of the first and the second channel in one color coordinate of the image representation.

Another example of current rows 56 used for computing the respective color coordinates is depicted in FIG. 9 for the case of the first, the second and the third channels being a red, a blue and a green channel.

A further possible operation mode is the vertical causal operation mode, which is explained with reference to FIG. 3. In the vertical causal operation mode, sample positions within one or more rows neighboring the current rows 56 in a first vertical direction, for example the top direction, may be included in the calculation of one or more of the first to sixth weighted sums 114', 124', 134', 144', 254', 264'. Advantageously, the first vertical direction points towards rows of the array which were received by the apparatus 100 temporally before the current rows 56, Thus, the CFA pattern image 10 may be coded without an additional temporal delay with respect to the stripe operation mode.

For example, in the vertical causal operation mode, the second weighted sum 124', the fourth weighted sum 144' and the sixth weighted sum 264' may be calculated as described with respect to the stripe operation mode. The third samples 16 for the first weighted sum 114' may consist of the third samples 16 located at third sample positions 26-1, 26' neighboring the first sample position 22' of the respective sample cluster 20' in horizontal directions and the third samples 16 located at the fourth sample positions 28', 28-2 neighboring the first sample position 22' in vertical directions. Additionally, the first and second color coordinates 110, 120 for computing the third weighted sum 134' may consist of the first color coordinates 110 located at the first sample positions 22', 22-1 neighboring the third sample position 26' of the respective sample cluster 20' in horizontal directions and the second color coordinates 120 located at the second sample positions 24', 24-2 neighboring the third sample position 26' in vertical directions. The fourth color coordinates 140 for calculating the fifth weighted sum 254' may consist of the fourth color coordinates 140 computed for the fourth sample positions 28', 28-1, 28-3, 28-4 neighboring the third sample position 26' of the respective sample cluster 20 in the four diagonal directions of the array. In other words, in examples of the vertical causal mode, only top-neighbors are accessed, and thus no additional latency is created, though one additional line must be buffered per lifting step. That is, the encoder, e.g. the apparatus 100, input buffer requirements may be increased by four lines, and the decoder, e.g. the apparatus 500 of FIG. 5, output buffer requirements may be increased by four lines.

In the stripe operation mode and the vertical causal operation mode, the first to sixth weighted sums 114', 124', 134', 144' may be weighted such that a total weight of contributions from sample positions neighboring the sample position for which the respective color coordinate is calculated in horizontal directions equals a total weight of contributions from sample positions neighboring the sample position for which the respective color coordinate is calculated vertical direction. That is, in case only one vertically neighboring sample position is considered, the respective value may be weighted double.

A further possible operation mode is the isotropic operation mode, in which samples located in rows neighboring the current rows 56 in both vertical directions are considered in the calculation of one or more or all of the color coordinates 110, 120, 130, 140, 250, 260. The first weighted sum 114', the third weighted sum 134' and the fifth weighted sum 254' may be calculated as described with respect to the vertical causal operation mode. The third samples 16 for the second weighted sum 124' may comprise the third samples 16 located at the fourth sample positions 28-1, 28' neighboring the second sample position 24' of the respective sample cluster 20' in horizontal directions and the third samples 16 located at the third sample positions 26', 26-2 neighboring the second sample position 24' in vertical directions. In this case, one additional row below the current rows 56 with respect to the previously described operation modes is used for calculating the second color coordinates 120. Additionally but optionally, e.g. depending on a maximum acceptable temporal delay introduced by the consideration of additional rows located below the current rows 56, the first and second color coordinates 110, 120 for computing the fourth weighted sum 144' may comprise the second color coordinates 120 located at the second sample positions 24', 24-1 neighboring the fourth sample position 28' of the respective sample cluster 20' in horizontal directions and the first color coordinates 110 located at the first sample positions 22', 22-2 neighboring the third sample position 26' in vertical directions. In this case, two additional rows below the current rows 56 with respect to the previously described operation modes are used. Additionally but optionally, the differential color coordinates 250 of the sixth weighted sum 264' may consist of the differential color coordinates 250 computed for the third sample positions 26', 26-1, 26-2, 26-3 neighboring the fourth sample position 28' of the respective sample cluster 20' in the four diagonal directions. In this case, four additional rows below the current rows 56 with respect to the previously described operation modes are used. In other words, the encoder transformation delays its output 70 by 4 lines or rows, and the decoder includes an additional delay by 4 lines or rows, thus the end-to-end latency may be increased by 8 lines rows.

According to embodiments, the apparatus 100 comprises a set of operation modes comprising one or more of the isotropic operation mode, the vertical causal operation mode and the stripe operation mode. Thus, one of the set of operation modes may be selected depending on available memory and depending on a maximum temporal delay which is acceptable for coding and decoding the CFA pattern image 10.

According to embodiments, the apparatus 100 may select one of the set of operation modes for coding the CFA pattern image 10 and made signal the selected operation mode in a data stream, in which the image representation 70 is signaled.

According to embodiments, the first filtered third sample value 112', the second filtered third sample value 122', the first filtered color coordinate 132', the second filtered color coordinate 142', the filtered fourth color coordinate 252', and the filtered differential color coordinate 262' are obtained from the first weighted sum 114', the second weighted sum 124', the third weighted sum 134', the fourth weighted sum 144', the fifth weighted sum 254', and the sixth weighted sum 264' by a rounding operation, respectively, what may allow for an efficient computation and storage of the respective color coordinates. For example, the rounding operation may be a floor or a cell operation, which may round a number to the next lower or higher integer number, respectively.

According to embodiments, the first weighted sum 114' and the second weighted sum 124' each represent an average of their respective third samples. Thus, the first and second color values 110', 120' may represent a difference between the first and second sample 12', 14', respectively, and a spatially filtered average value of the respective third samples neighboring the first and second sample positions 22', 24'.

According to embodiments, the weights of the third and fourth weighted sums 134', 144' consist of a first weight for weighting first color coordinates and a second weight for weighting second color coordinates. For example, the first weight may be implemented as a first power of two, and the second weight may be implemented as a second power of two, the exponents of the first and the second power of two being an integer number, for example negative, zero, or positive.

In the following, examples for computing the color coordinates 110, 120, 130, 140, 250, 260 are described in more detail. For illustrative purposes, and in accordance with some embodiments it is assumed, that the first channel is a red channel, the second channel is a blue channel, and the third channel is a green channel. Nevertheless, the described transformation is also advantageous for different configurations. For example, in further embodiments, the first and the second channel may be exchanged and/or the third channel may be a white channel. In the following formulas, R represents a first sample 12, B represents a second sample 22, and G represents a third sample 24 or, to be more precise, the sample value thereof. Also for illustrative purpose, but not limiting, the first vertical direction is chosen as top direction, the second vertical direction is chosen as bottom direction, and the horizontal directions are chosen is left and right. Neighboring samples of a sample position, for which the respective color coordinate is to be calculated, are indexed with l for left, r for right, t for top, and b for bottom, and lt, lb, rt, rb for the corresponding diagonal directions. Accordingly, the first color coordinate 110 may be referred to as a first chroma difference channel, $C_r$, the second color coordinate 120 may be referred to as a second chroma difference channel, $C_b$, the third color coordinate 130, may be referred to as a first magenta channel $M_1$, the fourth color coordinate 140 may be referred to as a second magenta channel $M_2$, the differential color coordinate 250 may be referred to as a magenta differential channel $\Delta$, and the combinational color coordinate 260 may be referred to as average magenta channel M.

According to an embodiment, in each of the third and the fourth weighted sums 134', 144', a total of weights for first color coordinates 110 equals a total of weights for second color coordinates 120, and the sum of weights of the respective weighted sum equals one. For this particular case, and in combination with the first and second weighted sums 114', 124' being equal weighted sums, this may form a spatial high-pass for the third channel, e.g. a green channel, and a high frequency component or a DC component of the resulting combinational color coordinate, contains mainly or even only components of the first and second channel, e.g. red and blue components, but no component of the third channel, e.g. a green component. Thus, in case the first and second channels represent a rest and a blue channel, a combinational color coordinate may be referred to as a magenta channel (M). In other words, the DC component of M may be the average of the red and blue channel, coining its name "magenta". Lifting, for example the third and the fourth listing steps, however, may ensure that the green DC component is reconstructable from $C_b$, $C_r$ and M. compacting the energy of the CFA pattern image into a magenta channel may result a more efficient coding, decreasing the signal-to-noise ratio, for example by 0.3 dB.

For example, in the first listing step, the first color coordinate 110 and the second color coordinate 120 may be computed according to the following formulas, which are excellent very shown for the isotropic operation mode:

$$C_b := B - \left\lfloor \frac{G_l + G_t + G_b + G_r}{4} \right\rfloor$$

$$C_r := R - \left\lfloor \frac{G_l + G_t + G_b + G_r}{4} \right\rfloor$$

In the "vertical causal" mode, $G_b$ in the computation of $C_b$ is replaced by $G_r$. In the "stripe operation mode, the previous substitution is made, and $G_l$ in the computation of $C_r$ is replaced by $G_b$, too.

In the second lifting step, the third color coordinate 130 and a fourth color coordinate 140 may be computed, in the isotropic operation mode, according to:

$$M_1 := G_1 + \left\lfloor \frac{2^r C_{r,l} + 2^b C_{b,t} + 2^b C_{b,b} + 2^r C_{r,r}}{8} \right\rfloor$$

$$M_2 := G_2 + \left\lfloor \frac{2^b C_{b,l} + 2^r C_{r,t} + 2^r C_{r,b} + 2^b C_{b,r}}{8} \right\rfloor$$

For example, $M_1$ samples are located at the top row, and $M_2$ channels are located on the bottom row. In the vertical causal operation mode, $C_{r,b}$ in the computation of $M_2$ may be replaced by $C_{r,t}$. In the stripe operation mode, additionally $C_{b,t}$ may be replaced by $C_{b,b}$. The substitution rules are similar to that of the first lifting step, namely to create the unavailable samples by reflection of a similar sample from above or below.

In the above formulas for M1 and M2, weights for first color coordinates 110 ($C_r$) are implemented as a first power of two, and weights for second color coordinates 120 ($C_b$) are implemented as a second power of two. For the case r=b=1, the exponent of the first power of two and the exponent of the second power of two are both equal to −2, resulting in a weight for each of the first and second color coordinates of ¼, so that the sum of weights of the third and a fourth weighted sum 134', 144', in this case, is one, thus providing an exemplary implementation for compacting the energy of the CFA pattern image into a magenta channel, for the case of the first and the second channel being red and blue channels, respectively.

According to embodiments, the fifth weighted sum 254' is an equal weighted average of the fourth color coordinates 140 of the fifth weighted sum 254'. For example, in this case, the differential color coordinates 250 may represent mainly differential components of the first two third channels, so that the differential color coordinates 250 may be particularly small, which allows for an efficient encoding.

For example, the differential color coordinate 250 may be computed, in the isotropic and the vertical causal operation mode, according to:

$$\Delta := M_1 - \left\lfloor \frac{M_{2,lt} + M_{2,lb} + M_{2,rt} + M_{2,rb}}{4} \right\rfloor$$

In the stripe operation mode, $M_{lt}$ may be replaced by $M_{lb}$, and $M_{rt}$ by $M_{rb}$.

According to embodiments, the sixth weighted sum 264' is an equal weighted average of the fourth color coordinates of the sixth weighted sum 264' and a sum of weights of the sixth weighted sum 264' equals one half.

For example, a combinational color coordinate 260 may be computed according to:

$$M := M_2 + \left\lfloor \frac{\Delta_{lt} + \Delta_{lb} + \Delta_{rt} + \Delta_{rb}}{8} \right\rfloor$$

Thus, the described transformation may contact the energy of the first and the second channel in the combinational color coordinate 216. In the vertical causal mode and the stripe operation mode, $\Delta_{lb}$ may be replaced by $\Delta_{lt}$ and $\Delta_{rb}$ may be replaced by $\Delta_{rt}$.

For example, the final output of the transformation, for example the compacted transformed representation 249, may be an array of $(M, C_b, C_r, \Delta)$ samples. These may be input to further spatial decorrelation, Optionally, $\Delta$ alone may not require additional spatial decorrelation.

Figure 4:
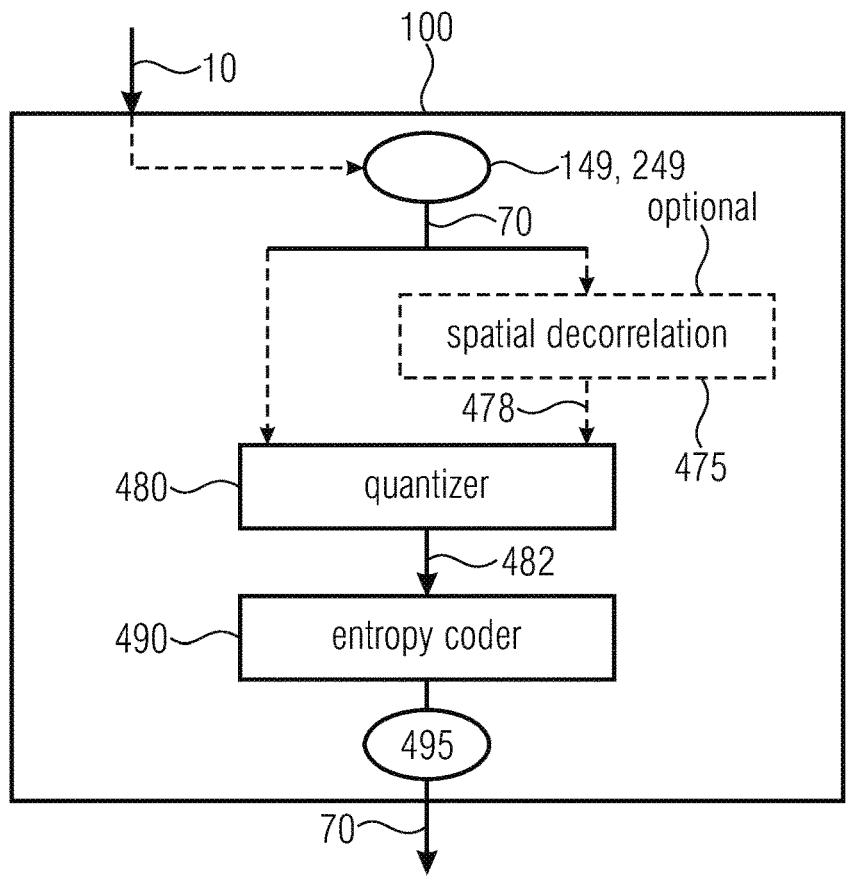
FIG. 4 shows an apparatus for coding a CFA pattern image according to a further embodiment.

FIG. 4 illustrates another example of the apparatus 100 for coding the CFA pattern image 10. As shown, the apparatus 100 may additionally comprise a quantizer 480 and an entropy coder 490. The quantizer 480 may derive a quantized representation 482 by quantizing the transformed representation 149, that is the first to fourth color coordinates 110, 120, 130, 140 of the sample clusters 20, or, alternatively, the compacted transformed representation 249, that is the first and second color coordinates 110, 120 and the differential color coordinate 250 and the combinational color coordinate 260 of the sample clusters 20. The entropy coder 490 may encode the quantized representation 482, so as to obtain an encoded representation 495, which may be provided as the image representation 70.

Optionally, the apparatus 100 may further comprise a spatial decorrelation stage 475 which may use a spatial decorrelation transform, for example a discrete cosine transformation or a discrete wavelet transformation to further spatially decorrelate the transformed representation 149 or the compacted transformed representation 249. In one example, the spatial decorrelation stage 475 applies the spatial decorrelation transform to the first to fourth color coordinates 110, 120, 130, 140, or the first, the second, the differential, and the combinational color coordinates 110, 120, 250, 260 so as to obtain a spatially decorrelated representation 478, based on which the quantizer 480 may derive the quantized representation 482. In another example, the spatial decorrelation stage 475 applies the spatial decorrelation transform with the first, the second, and the combinational color coordinates 110, 120, 2060 so as to obtain a spatially decorrelated representation 478, and the quantizer 480 may derive the quantized representation 482 from the spatially decorrelated representation 478 and the differential color coordinate 250 of the sample clusters 20.

Figure 5:
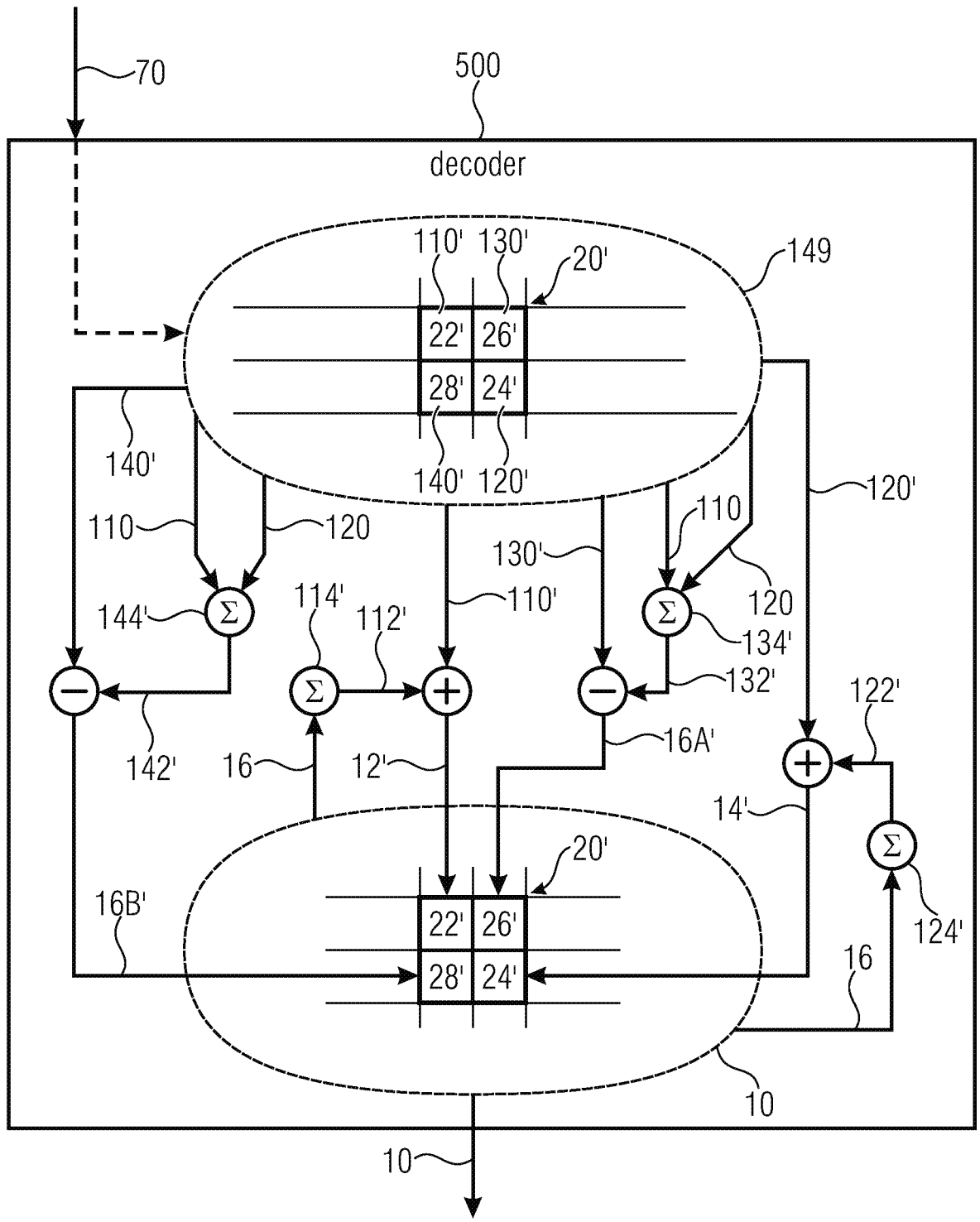
FIG. 5 shows an apparatus for decoding an image representation into a CFA pattern image according to an embodiment.

FIG. 5 shows a schematic representation of an apparatus 500 for decoding the image representation 70 so as to obtain the CFA pattern image 10. The apparatus 500 is configured to compute, for each sample cluster 20' of the sample clusters 20, the first sample 12', the second sample 14', and the two third samples 16A', 16B' from first to fourth color coordinates 110, 120, 130, 140.

The apparatus 500 may compute, for the third sample position 26' of the respective sample cluster 20', the third sample 16A' at the respective third sample position 26' by forming a difference of the third color coordinate 130' at the third sample position 26' of the respective sample cluster 20' and the first filtered color coordinate 132'. Further, the apparatus 500 may compute, for the fourth sample position 28' of each sample cluster 20' the third sample 16B' at the respective fourth sample position 28' by forming a difference of the fourth color coordinate 140' at the fourth sample position 28' of the respective sample cluster 20' and a second filtered color coordinate 142'. The first and second filtered color coordinates 132, 142 may be obtained from the first and second color coordinates as described with respect to the apparatus 100.

In a subsequent step, the apparatus 500 may compute, for the first sample position 22' of each sample cluster 20', the first sample 12' at the respective first sample position 22' by forming a summation of the first color coordinate 110' at the first sample position 22' of the respective sample cluster 20' and the first filtered third sample value 112'. Further, the apparatus 500 may compute, for the second sample position 24' of each sample cluster 20', a second sample 14' at the respective second sample position 14' by forming a summation of the second color coordinate 120' at the second sample position 24' of the respective sample cluster 20' and the second filtered third sample value 122'. The first and second filtered third sample values 112, 122 may be obtained from third samples 16 computed for third and fourth sample positions 26, 28 according to the previous step as described with respect to the apparatus 100.

The apparatus 500 may comprise, equivalently to the apparatus 100, a set of operation modes for computing the first to sixth weighted sums. According to embodiments, the apparatus 500 may derive the operation mode to be used for decoding the image representation from a data stream signaling the image representation and may select one of the set of operation modes accordingly.

Figure 6:
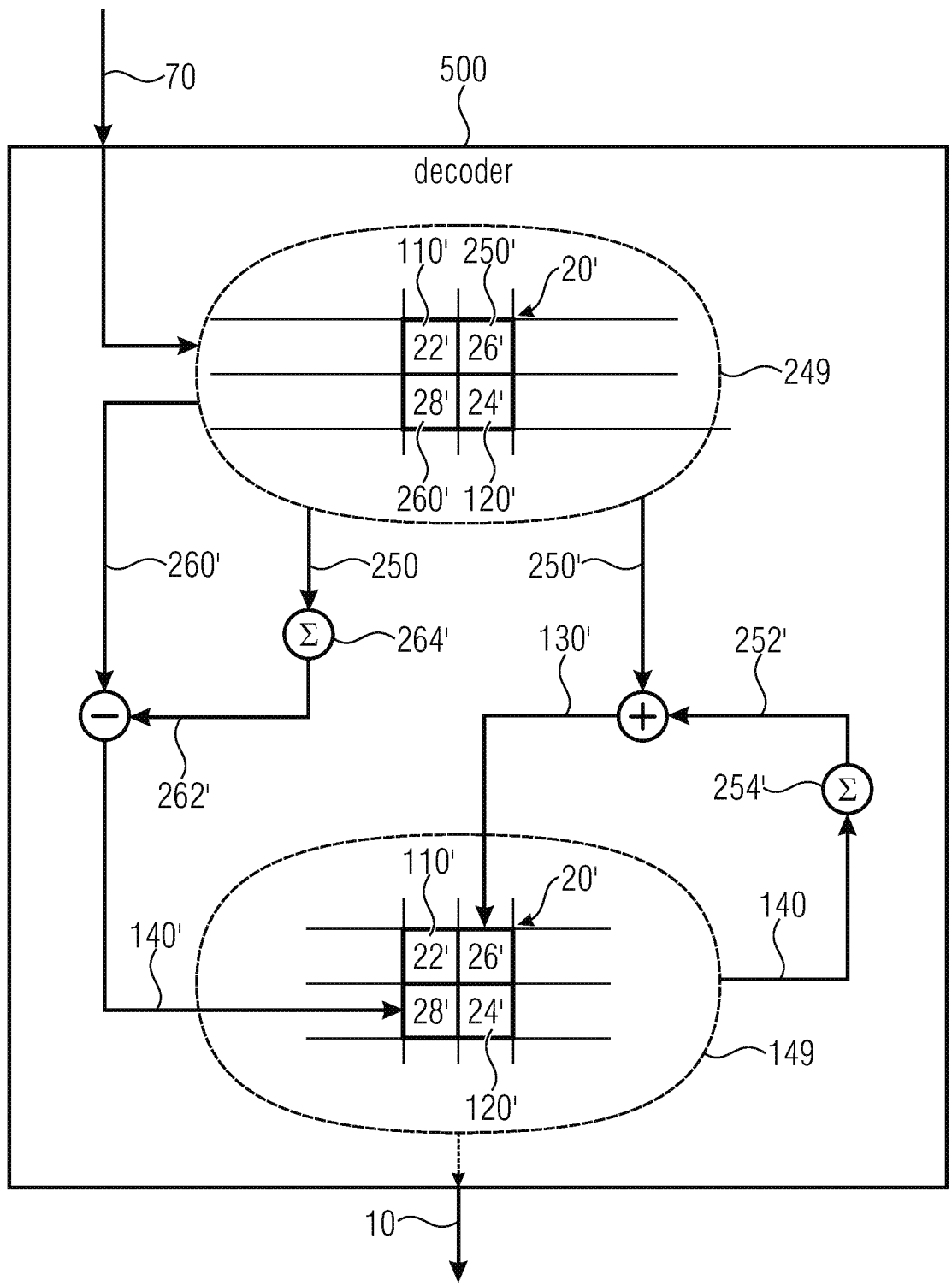
FIG. 6 shows an apparatus for decoding an image representation into a CFA pattern image according to a further embodiment.

FIG. 6 illustrates another example of the apparatus 500 configured to obtain the first to fourth sample 12, 14, 16A, 16B from first and second color coordinates 110, 120 and differential and combinational color coordinates 250, 260, which may signal within the image representation 70. The embodiment shown in FIG. 6 comprises two additional steps with respect to the embodiment shown in FIG. 5 for computing the third and fourth color coordinates 130, 140 from the differential and combinational color coordinates 250, 260.

For that purpose, the apparatus 500 may compute, for the fourth sample position 28' of the respective sample cluster 20', the fourth color coordinate 140' at the respective fourth sample position 28' by forming a difference of the combinational color coordinate 260' at the fourth sample position 28' of the respective sample cluster 20' and the filtered differential color coordinate 262'. The filtered differential color coordinates 262 may be obtained from differential color coordinates 250 as described with respect to the apparatus 100.

In a subsequent step, the apparatus 500 may compute, for the third sample position 26' of the respective sample cluster 20', the third color coordinate 130' at the respective third sample position 26' by forming a summation of the differential color coordinate 250' at the third sample position 26' of the respective sample cluster 20' and a filtered fourth color coordinate 252'. The filtered fourth color coordinates 252 may be obtained from fourth color coordinates 140 as described with respect to the apparatus 100.

Figure 7:
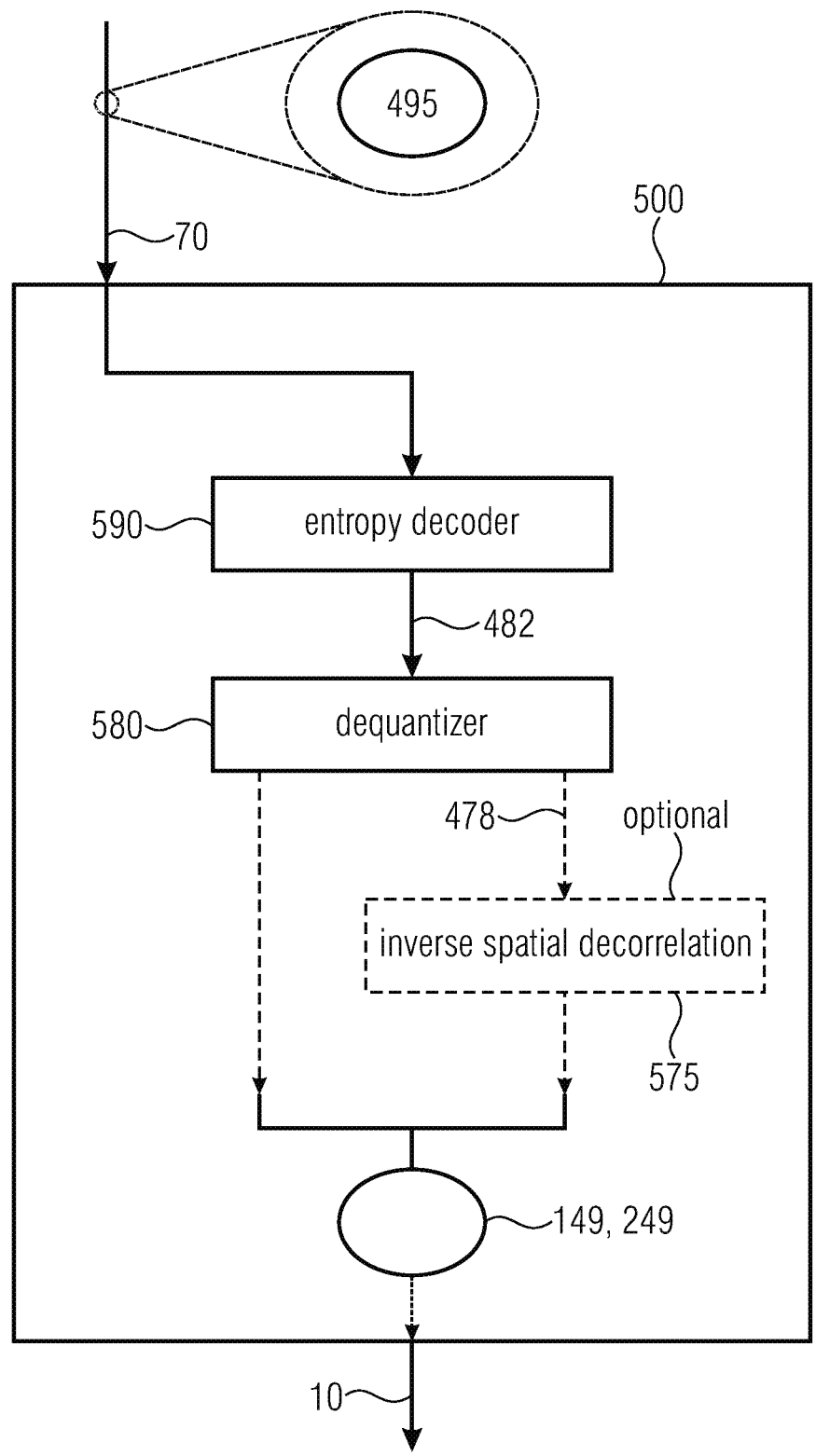
FIG. 7 shows an apparatus for decoding an image representation into a CFA pattern image according to a further embodiment.

FIG. 7 shows a schematic representation of another example of the apparatus 500, further comprising an entropy decoder 590 and a dequantizer 580. The entropy decoder 590 may decode an encoded representation 495, which may represent the image representation 70, so as to obtain the quantized representation 482. The dequantizer 580 may use an inverse quantization process so as to obtain, from the quantized representation 482, the first to fourth color coordinates 110, 120, 130, 140, which may be indicated as the transformed representation 149, or, alternatively, the first, the second, the differential, and the combinational color coordinates 110, 120, 250, 260, which may be indicated as the compacted transformed representation 249.

Optionally, the dequantizer 580 provides the spatially decorrelated representation 478 as introduced with respect to the apparatus 100 (cf. FIG. 4) and the apparatus 500 further comprises an inverse spatial decorrelation stage 575 which may use an inverse spatial decorrelation transform, for example an inverse discrete cosine transformation or an inverse discrete wavelet transformation, to derive the first to fourth color coordinates 110, 120, 130, 140, or the first, the second, the differential, and the combinational color coordinates 110, 120, 250, 260.

According to another option, the dequantizer 580 provides the spatially decorrelated representation 478 and the differential color coordinates 250 and the apparatus 500 further comprises the inverse spatial decorrelation stage 575 which may use the inverse spatial decorrelation transform to derive the first, the second, and the combinational color coordinates 110, 120, 260.

For further details of the apparatus 500 for decoding the image representation 70 into the CFA pattern image 10 reference is made to the description of the apparatus 100. Although, signals indicated with identical reference sign may possibly differ, e.g. due to a quantization loss, features of the apparatus 500 which are indicated with identical reference signs as with respect to the apparatus 100 have equivalent functionality and may be implemented equivalently as introduced in the respective description.

In the following, embodiments of the present disclosure in accordance with the first and second aspect are described. The embodiments are based on the apparatus 100 is shown in, as described with respect to FIG. 1.

In embodiments in accordance with the first aspect of the present disclosure, the third weighted sum 134' is computed in a manner so that a sum of weights of the third weighted sum 134' is larger than one half, and the fourth weighted sum 144' is derived in a manner so that a sum of weights of the fourth weighted sum 144' is larger than one half.

In embodiments in accordance with the second aspect of the present disclosure, the third sample positions 26 of the third samples 16 of the first weighted sum 114' exceed beyond the current rows 56 of the array, within which the respective sample cluster 20' is located. For example, the first weighted sum 114' may be calculated as described with respect to the isotropic operation mode or vertical causal operation mode. Optionally, also the computation of the second to sixth weighted sums 124', 134', 144', 254', 264' may be performed in accordance with one of the isotropic operation mode for the vertical causal operation mode. In other words, in accordance with the second aspect of the present disclosure, the apparatus 100, 500 may comprise one of the isotropic operation mode and the vertical causal operation mode. Different possible implementations of these operation modes are described above.

Further embodiments in accordance the second aspect, may additionally comprise the stripe operation mode. For example, the apparatus 100, 500 may select between the stripe operation mode and a first operation mode, which may, for example, correspond to the isotropic or the vertical causal operation mode. According to embodiments, the apparatus 100 may be configured to signal the operation mode used for computing the image representation 70 in a data stream, in which the image representation 70 is signaled. Accordingly, the apparatus 500 may be configured to derive, from the data stream, the operation modes to be used for decoding the image representation 70 so as to obtain the CFA pattern image.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for decoding an image representation into a color filter array (CFA) pattern image,
   wherein the CFA pattern image comprises first samples of a first channel, second samples of a second channel, and third samples of a third channel,
   wherein the CFA pattern image is partitioned into sample clusters, each of which comprises first to fourth sample positions with one of the first samples located at the first sample position, one of the second samples located at the second sample position, and two third samples located at the third and fourth sample positions, respectively,
   wherein the apparatus is configured to derive, for each sample cluster, a first color coordinate for the first sample position of the respective sample cluster, a second color coordinate for the second sample position of the respective sample cluster, a third color coordinate for the third sample position of the respective sample cluster and a fourth color coordinate for the fourth sample position of the respective sample cluster,
   wherein the apparatus is configured to decode the image representation into the CFA pattern image by computing
      for the third sample position of each sample cluster, the third sample at the respective third sample position by forming a difference of the third color coordinate at the third sample position and a first filtered color coordinate which is derived by forming a third weighted sum of first and second color coordinates located at first and second sample positions neighboring the third sample position in a manner so that a sum of weights of the third weighted sum is larger than one half,
      for the fourth sample position of each sample cluster, the third sample at the respective fourth sample position by forming a difference of the fourth color coordinate at the fourth sample position and a second filtered color coordinate which is derived by forming a fourth weighted sum of first and second color coordinates located at first and second sample positions neighboring the fourth sample position in a manner so that a sum of weights of the fourth weighted sum is larger than one half,
      for the first sample position of each sample cluster, the first sample at the respective first sample position by forming a summation of the first color coordinate at the first sample position and a first filtered third sample value derived by forming a first weighted sum of third samples computed for third and fourth sample positions neighboring the first sample position,
      for the second sample position of each sample cluster, a second sample at the respective second sample position by forming a summation of the second color coordinate at the second sample position and a second filtered third sample value derived by forming a second weighted sum of third samples computed for third and fourth sample positions neighboring the second sample position.

2. The apparatus according to claim 1, wherein the weights of the third and fourth weighted sums comprise a first weight for weighting first color coordinates and a second weight for weighting second color coordinates.

3. The apparatus according to claim 2, wherein the first weight is implemented as a first power of two, and wherein the second weight is implemented as a second power of two, wherein the exponents of the first and the second power of two is an integer number.

4. The apparatus according to claim 1, wherein the first to fourth sample positions are arranged in an array with rows of a first type, each comprising alternately arranged first sample positions and third sample positions, and rows of a second type comprising alternately arranged second sample positions and third sample positions, wherein the rows of the first type and rows of the second type are arranged alternatingly along columns of the array, and wherein the third sample positions within the rows of the first type on the one hand and the third sample positions within the rows of the second type one the other hand are located in different columns.

5. The apparatus according to claim 4, wherein the apparatus comprises a set of operation modes comprising at least one of an isotropic operation mode, a vertical causal operation mode and a stripe operation mode, wherein, except for sample clusters located at an edge of the CFA pattern image, the apparatus is configured to exclusively include, for computing one or more of the color coordinates for one of the sample positions of the respective sample cluster,
   in the isotropic operation mode, samples located at sample positions within one or more current rows within which the respective sample cluster is located, and samples located in rows above and below the current rows,
   in the vertical causal operation mode, samples located at sample positions within the current rows, and samples located in one or more rows above the current rows, and
   in the stripe operation mode, samples located at sample positions within the current rows.

6. The apparatus according to claim 5, wherein the apparatus is configured to select one of the set of operation modes and wherein the apparatus is configured to derive the operation mode to be used for decoding the image representation from a data stream signaling the image representation.

7. The apparatus according to claim 1, wherein the third and fourth weighted sums are equal weighted averages of the respective first and second color coordinates.

8. The apparatus according to claim 1, wherein the apparatus is configured to use a rounding operation to derive the first filtered third sample value from the first weighted sum, the second filtered third sample value from the second weighted sum, the first filtered color coordinate from the third weighted sum, and the second filtered color coordinate from the fourth weighted sum.

9. The apparatus according to claim 1, wherein the apparatus is configured to derive the third and fourth color coordinates by computing
for the fourth sample position of each sample cluster, the fourth color coordinate at the respective fourth sample position by forming a difference of the combinational color coordinate at the fourth sample position and a filtered differential color coordinate which is derived by forming a fifth weighted sum of differential color coordinates located at third sample positions neighboring the fourth sample position,
for the third sample position of each sample cluster, the third color coordinate at the respective third sample position by forming a summation of the differential color coordinate at the third sample position and a filtered fourth color coordinate which is derived by forming a sixth weighted sum of fourth color coordinates computed for fourth sample positions neighboring the third sample position.

10. The apparatus according to claim 8, wherein the apparatus is configured to use a rounding operation to derive the filtered differential color coordinate from the fifth weighted sum, and the filtered fourth color coordinate from the sixth weighted sum.

11. The apparatus according to claim 9, wherein the first to fourth sample positions are arranged in an array with rows of a first type, each comprising alternately arranged first sample positions and third sample positions, and rows of a second type comprising alternately arranged second sample positions and third sample positions, wherein the rows of the first type and rows of the second type are arranged alternatingly along columns of the array, and wherein the third sample positions within the rows of the first type on the one hand and the third sample positions within the rows of the second type one the other hand are located in different columns, and wherein the apparatus comprises an isotropic operation mode, wherein,
the third samples of the first weighted sum comprise the third samples neighboring the first sample position in vertical and horizontal directions of the array,
the third samples of the second weighted sum comprise the third samples neighboring the second sample position in vertical and horizontal directions of the array,
the first and second color coordinates of the third weighted sum comprise the first and second color coordinates computed for first and second sample positions neighboring the third sample position in vertical and horizontal directions of the array,
the first and second color coordinates of the fourth weighted sum comprise the first and second color coordinates computed for first and second sample positions neighboring the fourth sample position in vertical and horizontal directions of the array,
the fourth color coordinates of the fifth weighted sum comprise the fourth color coordinates computed for fourth sample positions neighboring the third sample position in diagonal directions of the array,
the differential color coordinates of the sixth weighted sum comprise the differential color coordinates computed for third sample positions neighboring the fourth sample position in diagonal directions of the array.

12. The apparatus according to claim 9, wherein the first to fourth sample positions are arranged in an array with rows of a first type, each comprising alternately arranged first sample positions and third sample positions, and rows of a second type comprising alternately arranged second sample positions and third sample positions, wherein the rows of the first type and rows of the second type are arranged alternatingly along columns of the array, and wherein the third sample positions within the rows of the first type on the one hand and the third sample positions within the rows of the second type one the other hand are located in different columns, and wherein the apparatus comprises a vertical causal operation mode, wherein,
the third samples of the first weighted sum comprise the third samples neighboring the first sample position in vertical and horizontal directions of the array,
the third samples of the second weighted sum comprise the third samples neighboring the second sample position in horizontal directions and a first vertical direction of the array, wherein a sum of weights of the second weighted sum for the third samples neighboring the second sample position in horizontal directions equals a weight of the second weighted sum for the third sample neighboring the second sample position in the first vertical direction,
the first and second color coordinates of the third weighted sum comprise the first and second color coordinates computed for first and second sample positions neighboring the third sample position in vertical and horizontal directions of the array,
the first and second color coordinates of the fourth weighted sum comprise the first and second color coordinates computed for first and second sample positions neighboring the fourth sample position in horizontal directions and the first vertical direction of the array,
the fourth color coordinates of the fifth weighted sum comprise the fourth color coordinates computed for fourth sample positions neighboring the third sample position in diagonal directions of the array,
the differential color coordinates of the sixth weighted sum comprise the differential color coordinates computed for third sample positions neighboring the fourth sample position in a first and a second diagonal direction of the array, wherein vertical components of the first and the second diagonal directions point towards the same direction as the first vertical direction.

13. The apparatus according to claim 9, wherein the first to fourth sample positions are arranged in an array with rows of a first type, each comprising alternately arranged first sample positions and third sample positions, and rows of a second type comprising alternately arranged second sample positions and third sample positions, wherein the rows of the first type and rows of the second type are arranged alternatingly along columns of the array, and wherein the third sample positions within the rows of the first type on the one hand and the third sample positions within the rows of the second type one the other hand are located in different columns, and wherein the apparatus comprises a stripe operation mode, wherein,
the third samples of the first weighted sum comprise the third samples neighboring the first sample position in horizontal directions and a second vertical direction of the array, wherein a sum of weights of the weighted sum for the third samples neighboring the second sample position in horizontal directions equals a weight of the weighted sum for the third sample neighboring the second sample position in the second vertical direction, the third samples of the second weighted sum comprise the third samples neighboring the second sample position in horizontal directions and a first vertical direction of the array, wherein a sum of weights of the weighted sum for the third samples neighboring the second sample position in horizontal directions equals a weight of the weighted sum for the third sample neighboring the first sample position in the first vertical direction, the first and second color coordinates of the third weighted sum comprise the first and second color coordinates computed for first and second sample positions neighboring the third sample position in horizontal directions and the second vertical direction of the array, the first and second color coordinates of the fourth weighted sum comprise the first and second color coordinates computed for first and second sample positions neighboring the fourth sample position in horizontal directions and the first vertical direction of the array, the fourth color coordinates of the fifth weighted sum comprise the fourth color coordinates computed for fourth sample positions neighboring the third sample position in a third and a fourth diagonal direction of the array, wherein vertical components of the third and the fourth diagonal directions point towards the same direction as the second vertical direction, the differential color coordinates of the sixth weighted sum comprise the differential color coordinates computed for third sample positions neighboring the fourth sample position in a first and a second diagonal direction of the array, wherein vertical components of the first and the second diagonal directions point towards the same direction as the first vertical direction.

14. The apparatus according to claim 9, wherein the sixth weighted sum is an equal weighted sum, wherein a sum of weights of the sixth weighted sum equals one half.

15. The apparatus according to claim 9, wherein the fifth weighted sum is an equal weighted average of the fourth color coordinates.

16. The apparatus according to claim 1, wherein the apparatus is configured to receive an encoded representation as the image representation, and wherein the apparatus further comprises an entropy decoder configured to decode the encoded representation so as to derive a quantized representation of the image representation, and a dequantizer configured to derive the first to fourth color coordinates, or the first, the second, the differential, and the combinational color coordinates by an inverse quantization process.

17. The apparatus according to claim 1, wherein the apparatus is configured to receive an encoded representation as the image representation, and wherein the apparatus further comprises an entropy decoder configured to decode the encoded representation so as to derive a quantized representation of the image representation, a dequantizer configured to derive a spatially decorrelated representation based on the quantized representation by an inverse quantization process, and an inverse spatial decorrelation stage configured to derive the first to fourth color coordinates, or the first, the second, the differential, and the combinational color coordinates from the spatially decorrelated representation by using an inverse spatial decorrelation transform.

18. The apparatus according to claim 9, wherein the apparatus is configured to receive an encoded representation as the image representation, and wherein the apparatus further comprises an entropy decoder configured to decode the encoded representation so as to derive a quantized representation of the image representation, a dequantizer configured to derive a spatially decorrelated representation and the differential color coordinates based on the quantized representation by an inverse quantization process, and an inverse spatial decorrelation stage configured to derive the first, the second, and the combinational color coordinates from the spatially decorrelated representation by using an inverse spatial decorrelation transform.

19. An apparatus for coding a color filter array (CFA) pattern image into an image representation, wherein the CFA pattern image comprises first samples of a first channel, second samples of a second channel, and third samples of a third channel, wherein the CFA pattern image is partitioned into sample clusters, each of which comprises first to fourth sample positions with one of the first samples located at the first sample position, one of the second samples located at the second sample position, and two third samples located at the third and fourth sample positions, respectively, wherein the apparatus is configured to code the CFA pattern image into the image representation by computing for the first sample position of each sample cluster, a first color coordinate so that the first color coordinate is representative of a difference of the first sample at the first sample position and a first filtered third sample value derived by forming a first weighted sum of third samples neighboring the first sample position, for the second sample position of each sample cluster, a second color coordinate so that the second color coordinate is representative of a difference of the second sample at the second sample position and a second filtered third sample value derived by forming a second weighted sum of third samples neighboring the second sample position, for the third sample position of each sample cluster, a third color coordinate by forming a summation of the third sample at the third sample position and a first filtered color coordinate which is derived by forming a third weighted sum of first and second color coordinates computed for first and second sample positions neighboring the third sample position in a manner so that a sum of weights of the third weighted sum is larger than one half, for the fourth sample position of each sample cluster, a fourth color coordinate by forming a summation of the third sample at the fourth sample position and a second filtered color coordinate which is derived by a fourth weighted sum of first and second color coordinates computed for first and second sample positions neighboring the fourth sample position in a manner so that a sum of weights of the fourth weighted sum is larger than one half.

20. A method for decoding an image representation into a CFA pattern image,
  wherein the CFA pattern image comprises first samples of a first channel, second samples of a second channel, and third samples of a third channel,
  wherein the CFA pattern image is partitioned into sample clusters, each of which comprises first to fourth sample positions with one of the first samples located at the first sample position, one of the second samples located at the second sample position, and two third samples located at the third and fourth sample positions, respectively,
  wherein the method comprises deriving, for each sample cluster, a first color coordinate for the first sample position of the respective sample cluster, a second color coordinate for the second sample position of the respective sample cluster, a third color coordinate for the third sample position of the respective sample cluster and a fourth color coordinate for the fourth sample position of the respective sample cluster,
  wherein the method comprises decoding the image representation into the CFA pattern image by computing
    for the third sample position of each sample cluster, the third sample at the respective third sample position by forming a difference of the third color coordinate at the third sample position and a first filtered color coordinate which is derived by forming a third weighted sum of first and second color coordinates located at first and second sample positions neighboring the third sample position in a manner so that a sum of weights of the third weighted sum is larger than one half,
    for the fourth sample position of each sample cluster, the third sample at the respective fourth sample position by forming a difference of the fourth color coordinate at the fourth sample position and a second filtered color coordinate which is derived by forming a fourth weighted sum of first and second color coordinates located at first and second sample positions neighboring the fourth sample position in a manner so that a sum of weights of the fourth weighted sum is larger than one half,
    for the first sample position of each sample cluster, the first sample at the respective first sample position by forming a summation of the first color coordinate at the first sample position and a first filtered third sample value derived by forming a first weighted sum of third samples computed for third and fourth sample positions neighboring the first sample position,
    for the second sample position of each sample cluster, a second sample at the respective second sample position by forming a summation of the second color coordinate at the second sample position and a second filtered third sample value derived by forming a second weighted sum of third samples computed for third and fourth sample positions neighboring the second sample position.

21. A method for coding a color filter array (CFA) pattern image into an image representation,
  wherein the CFA pattern image comprises first samples of a first channel, second samples of a second channel, and third samples of a third channel,
  wherein the CFA pattern image is partitioned into sample clusters, each of which comprises first to fourth sample positions with one of the first samples located at the first sample position, one of the second samples located at the second sample position, and two third samples located at the third and fourth sample positions, respectively, wherein the method comprises coding the CFA pattern image into the image representation by computing
    for the first sample position of each sample cluster, a first color coordinate so that the first color coordinate is representative of a difference of the first sample at the first sample position and a first filtered third sample value derived by forming a first weighted sum of third samples neighboring the first sample position,
    for the second sample position of each sample cluster, a second color coordinate so that the second color coordinate is representative of a difference of the second sample at the second sample position and a second filtered third sample value derived by forming a second weighted sum of third samples neighboring the second sample position,
    for the third sample position of each sample cluster, a third color coordinate by forming a summation of the third sample at the third sample position and a first filtered color coordinate which is derived by forming a third weighted sum of first and second color coordinates computed for first and second sample positions neighboring the third sample position in a manner so that a sum of weights of the third weighted sum is larger than one half,
    for the fourth sample position of each sample cluster, a fourth color coordinate by forming a summation of the third sample at the fourth sample position and a second filtered color coordinate which is derived by a fourth weighted sum of first and second color coordinates computed for first and second sample positions neighboring the fourth sample position in a manner so that a sum of weights of the fourth weighted sum is larger than one half.

22. A non-transitory digital storage medium having stored thereon a computer program for performing a method for decoding an image representation into a CFA pattern image,
  wherein the CFA pattern image comprises first samples of a first channel, second samples of a second channel, and third samples of a third channel,
  wherein the CFA pattern image is partitioned into sample clusters, each of which comprises first to fourth sample positions with one of the first samples located at the first sample position, one of the second samples located at the second sample position, and two third samples located at the third and fourth sample positions, respectively,
  wherein the method comprises deriving, for each sample cluster, a first color coordinate for the first sample position of the respective sample cluster, a second color coordinate for the second sample position of the respective sample cluster, a third color coordinate for the third sample position of the respective sample cluster and a fourth color coordinate for the fourth sample position of the respective sample cluster,
  wherein the method comprises decoding the image representation into the CFA pattern image by computing
    for the third sample position of each sample cluster, the third sample at the respective third sample position by forming a difference of the third color coordinate at the third sample position and a first filtered color coordinate which is derived by forming a third weighted sum of first and second color coordinates located at first and second sample positions neighboring the third sample position in a manner so that a sum of weights of the third weighted sum is larger than one half, for the fourth sample position of each sample cluster, the third sample at the respective fourth sample position by forming a difference of the fourth color coordinate at the fourth sample position and a second filtered color coordinate which is derived by forming a fourth weighted sum of first and second color coordinates located at first and second sample positions neighboring the fourth sample position in a manner so that a sum of weights of the fourth weighted sum is larger than one half, for the first sample position of each sample cluster, the first sample at the respective first sample position by forming a summation of the first color coordinate at the first sample position and a first filtered third sample value derived by forming a first weighted sum of third samples computed for third and fourth sample positions neighboring the first sample position, for the second sample position of each sample cluster, a second sample at the respective second sample position by forming a summation of the second color coordinate at the second sample position and a second filtered third sample value derived by forming a second weighted sum of third samples computed for third and fourth sample positions neighboring the second sample position, when said computer program is run by a computer.

23. A non-transitory digital storage medium having stored thereon a computer program for performing a method for coding a color filter array (CFA) pattern image into an image representation, wherein the CFA pattern image comprises first samples of a first channel, second samples of a second channel, and third samples of a third channel, wherein the CFA pattern image is partitioned into sample clusters, each of which comprises first to fourth sample positions with one of the first samples located at the first sample position, one of the second samples located at the second sample position, and two third samples located at the third and fourth sample positions, respectively, wherein the method comprises coding the CFA pattern image into the image representation by computing for the first sample position of each sample cluster, a first color coordinate so that the first color coordinate is representative of a difference of the first sample at the first sample position and a first filtered third sample value derived by forming a first weighted sum of third samples neighboring the first sample position, for the second sample position of each sample cluster, a second color coordinate so that the second color coordinate is representative of a difference of the second sample at the second sample position and a second filtered third sample value derived by forming a second weighted sum of third samples neighboring the second sample position, for the third sample position of each sample cluster, a third color coordinate by forming a summation of the third sample at the third sample position and a first filtered color coordinate which is derived by forming a third weighted sum of first and second color coordinates computed for first and second sample positions neighboring the third sample position in a manner so that a sum of weights of the third weighted sum is larger than one half, for the fourth sample position of each sample cluster, a fourth color coordinate by forming a summation of the third sample at the fourth sample position and a second filtered color coordinate which is derived by a fourth weighted sum of first and second color coordinates computed for first and second sample positions neighboring the fourth sample position in a manner so that a sum of weights of the fourth weighted sum is larger than one half, when said computer program is run by a computer.

24. A data stream comprising the image representation generated with an apparatus according to claim 19.

* * * * *